United States Patent [19]
Kumazawa et al.

[11] Patent Number: 6,161,991
[45] Date of Patent: Dec. 19, 2000

[54] METHOD OF MACHINING CRANKSHAFT

[75] Inventors: Tadashi Kumazawa, Aichi-ken; Masumi Shimomura, Ishikawa-ken, both of Japan

[73] Assignee: Komatsu Machinery Corp., Komatsu, Japan

[21] Appl. No.: 09/202,469

[22] PCT Filed: Aug. 29, 1997

[86] PCT No.: PCT/JP97/03033

§ 371 Date: Dec. 14, 1998

§ 102(e) Date: Dec. 14, 1998

[87] PCT Pub. No.: WO98/08642

PCT Pub. Date: Mar. 5, 1998

[30] Foreign Application Priority Data

Aug. 30, 1996 [JP] Japan .................................. 8-229868
Oct. 17, 1996 [JP] Japan .................................. 8-274771

[51] Int. Cl.[7] ............................................... B23C 3/06
[52] U.S. Cl. ........................... 409/132; 409/197; 409/200; 82/1.11; 82/106; 29/888.08
[58] Field of Search .................... 82/1.11, 106; 409/132, 409/199, 200, 197; 29/888.08, 6.01, 558

[56] References Cited

U.S. PATENT DOCUMENTS

| | | | |
|---|---|---|---|
| 2,285,772 | 6/1942 | Groene et al. | 29/888.08 |
| 2,290,324 | 7/1942 | Groene et al. | 29/888.08 |
| 5,513,932 | 5/1996 | Asada | 409/132 |
| 5,647,705 | 7/1997 | Shimomura | 409/132 |
| 5,725,339 | 3/1998 | Yoshita | 409/132 |
| 5,997,452 | 12/1999 | Assie | 483/15 |
| 6,026,549 | 2/2000 | Makino et al. | 29/27 R |

FOREIGN PATENT DOCUMENTS

| | | |
|---|---|---|
| 54-34188 | 3/1979 | Japan . |
| 6-226511 | 8/1994 | Japan . |
| 6-297221 | 10/1994 | Japan . |

*Primary Examiner*—Henry W. H. Tsai
*Attorney, Agent, or Firm*—Frishauf, Holtz, Goodman, Langer & Chick, P.C.

[57] ABSTRACT

A method of machining a crankshaft from a workpiece whereby all of pin and journal portions of the workpiece are milled and thereby machined with a single crankshaft miller unit. The method comprises: establishing a phase position of the workpiece (3) with a phase positioning jaw (4c) that is provided in one of the chucks (4); clamping the workpiece (3) at its opposed ends with both the chucks (4); milling with a cutter (5e), thereby machining journal and pin portions of the workpiece (3) in succession; after all of the journal and pin portions are milled in the workpiece (3) except a first journal portion (J1) that is located at a position where the phase positioning jaw (4c) and the cutter (5e) may interfere with each other, unclamping the one chuck (4) provided with the phase positioning jaw (4c) and retracting that one chuck (4) to a position at which the jaw (4c) and the cutter (5e) may no longer interfere with each other; clamping again the workpiece (3) at its opposed ends with both the chucks (4); and thereafter milling and thereby machining the first journal portion (J1) with the cutter (5e).

4 Claims, 15 Drawing Sheets

○ LEFT HAND SIDE CUTTER
● RIGHT HAND SIDE CUTTER
✕ RIGHT HAND SIDE WORK REST

METHOD OF MACHINING CRANKSHAFT

TECHNICAL FIELD

The present invention relates to a method of machining a crankshaft as used in an engine.

BACKGROUND ART

A crankshaft as employed in an engine that can be mounted, e. g., in an automobile has pins and journals typically milled and thereby machined, i. e., shaped, by a crankshaft miller in a workpiece.

A crankshaft shaping miller known in the art is described, e. g., in Japanese Unexamined Patent Publication No. Hei 6-297221.

A crankshaft miller as described in that publication makes use of a cutter which is smaller in width than a pin and a journal of a crankshaft to be machined, in order to permit a workpiece with pin and journal portions that vary in width to be machined by milling those portions each individually in a number of, say, six, divided steps.

The crankshaft miller to mill and thereby machine each of such pin and journal portions in a workpiece also requires the workpiece to be positioned with respect to an angle of rotation thereof, thus a phase position thereof.

Such phase positioning is effected by preliminarily machining a reference seat provided for this purpose in the one of counter weight portions that is located at one end of a workpiece and then, before the workpiece is introduced into the crankshaft miller and is clamped at its opposed ends each with a chuck, by bringing the phase positioning reference seat on the workpiece in contact with a phase positioning jaw located at one of the chucks.

The conventional crankshaft miller, however, makes it impossible to machine the one of journal portions that is located adjacent to the end of the workpiece at which the reference positioning seat is provided, because of interference between the cutter and the phase positioning jaw brought in contact with the reference seat.

This has hitherto required such a journal portion to be machined in a separate step using a separate machine tool such as a lathe. Poor productivity results from the increased number of machining steps necessitated and an added cost of the equipment is incurred because of the use of separate equipment such as a lathe thus rendering the prior art disadvantageous.

It is accordingly an object of the present invention to provide a method of machining a crankshaft from a workpiece whereby all of pin and journal portions of the workpiece are milled or thereby machined with a single crankshaft miller unit.

SUMMARY OF THE INVENTION

In order to achieve the object described above, there is provided in accordance with the present invention as a first embodiment thereof, a method of machining a crankshaft from a workpiece with its opposed ends clamped by a pair of chucks by a rotating cutter to mill and thereby machine journal and pin portions of the crankshaft workpiece successively, which method comprises the steps of:

providing a phase positioning jaw in one of the said chucks;

establishing a phase position of the workpiece with the said phase positioning jaw;

clamping the workpiece at its opposed ends with both the said chucks;

milling with the said cutter and thereby machining the Journal and pin portions of the said workpiece in succession;

after all of the journal and pin portions are milled and thereby machined in the said workpiece except a first journal portion that is located at a position at which the said phase positioning jaw and the said cutter may interfere with each other, unclamping the one chuck provided with the said phase positioning jaw and retracting the said chuck to a position at which the said Jaw and the said cutter may no longer interfere with each other;

clamping again the said workpiece at its opposed ends with both the said chucks; and thereafter milling and thereby machining the said first Journal portion with the said cutter.

The present invention also provides in a second embodiment thereof a method of machining a crankshaft from a workpiece with its opposed ends clamped by a pair of chucks by a rotating cutter to mill and thereby machine journal and pin portions of the crankshaft workpiece successively, which method comprises the steps of:

providing a phase positioning jaw in one of the said chucks;

clamping the workpiece at its opposed ends with both the said chucks at a position at which the said phase positioning Jaw and the said cutter may not interfere with each other; thereafter milling and thereby machining a first journal portion in the said workpiece with the said cutter;

unclamping the said both chucks and then advancing the said one chuck and establishing a phase position of the said workpiece with the said phase positioning Jaw;

clamping again the said workpiece at its opposed ends with the said both chucks; and thereafter milling and thereby machining all of the journal and pin portions other than the said first journal portion in the said workpiece in succession with the said cutter.

The present invention further provides in a third embodiment thereof a method of machining a crankshaft from a workpiece with its opposed ends clamped by a pair of chucks by a rotating cutter to mill and thereby machine journal and pin portions of the crankshaft wqrkpiece successively, which method comprises the steps of:

providing a phase positioning reference pin in one of the said chucks;

establishing a phase position of the workpiece with the said phase positioning reference pin;

clamping the workpiece at its opposed ends with both the said chucks; and thereafter milling with the said cutter, and thereby machining the journal and pin portions of the said workpiece in succession.

The present invention further provides in a fourth embodiment thereof a method of machining a crankshaft from a workpiece with its opposed ends supported by a pair of centers and clamped by a pair of chucks by a rotating cutter to mill and thereby machine journal and pin portions in the workpiece successively, which method comprises the steps of:

providing a phase positioning jaw in one of the said chucks;

establishing a phase position of the workpiece with the said phase positioning jaw;

clamping the workpiece at its opposed ends with both said chucks; and thereafter milling with the said cutter, thereby machining the journal and pin portions of the workpiece in succession;

after all of the journal and pin portions are milled and thereby machined in the said workpiece except a first journal portion that is located at a position at which the said phase positioning jaw and the said cutter may interfere with each other, unclamping the one chuck provided with the said phase positioning jaw and retracting the said chuck to a site at which the said jaw and the said cutter may no longer interfere with each other;

clamping one of the said centers that is located proximal to the said first journal with the said one chuck; and thereafter milling and thereby machining the said first journal with the said cutter.

The present invention also provides in a fifth embodiment thereof a method of machining a crankshaft from a workpiece with its opposed ends supported by a pair of centers and clamped by a pair of chucks by a rotating cutter to mill and thereby machine journal and pin portions in the workpiece successively, which method comprises the steps of:

providing a phase positioning jaw in one of the said chucks;

clamping one of the said centers that is located proximal to a first journal portion of the workpiece with the one chuck provided with the said phase positioning jaw at a position at which the said phase positioning jaw may not interfere with the said cutter and clamping the said workpiece at its opposite end with the other of the said chucks; thereafter milling and thereby machining a first journal portion in the said workpiece with the said cutter;

unclamping the said both chucks and then advancing the said one chuck and establishing a phase position of the said workpiece with the said phase positioning jaw;

clamping again the said workpiece at its opposed ends with the said both chucks; and thereafter milling and thereby machining all of the journal and pin portions other than the said first journal portion in the said workpiece in succession with the said cutter.

According to the present invention embodied in these forms, all of journal and pin portions in a workpiece can be machined with a single unit of crankshaft miller; hence it becomes unnecessary to provide a separate machine tool tailored and to carry out a separate machining process stage required as in the prior art, to machine the first Journal portion in the workpiece.

Thus, the thereby reduced number of process stages required to machine a crankshaft enhances its productivity and the eliminated need for a special machine tool dedicated to machine the first journal portion reduces the cost of equipment for manufacture.

Also, the ability to machine all of journal and pin portions in a single, given line of manufacture permits the line to be automated and unmanned. Then, the use of a multi-edge cutter with a multiplicity of tips, which provides a longer serviceable tool life than a single edge cutter, enhances the serviceability of a given crankshaft miller and results in a consequential improvement in its productivity as well.

Of the forms of embodiment described, the first and second are advantageously applicable to a workpiece with its pulley shaft elongated whereas the fourth and fifth are conveniently available for a workpiece with its pulley shaft short in length. Such selective applicability or availability of the embodiments of the method of the present invention in accordance with particular workpiece configurations makes the use of a given crankshaft miller highly flexible. In particular, where a workpiece with a short pulley shaft is machined, the elongate center on the side of the chuck retracted can be held clamped with a claw member to prevent the latter from fluctuating in position under a reactive force in milling, thus permitting a first journal portion to be milled and thereby machined highly accurately.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings hereof are intended in no way to limit the present invention but to facilitate an explanation and understanding thereof.

In the accompanying drawings

BEST MODES FOR CARRYING OUT THE INVENTION

Hereinafter, suitable embodiments of the present invention with respect to a combined machining apparatus and a crankshaft machining method by using the same are set out with reference to the accompanying drawings hereof.

Figure 1:
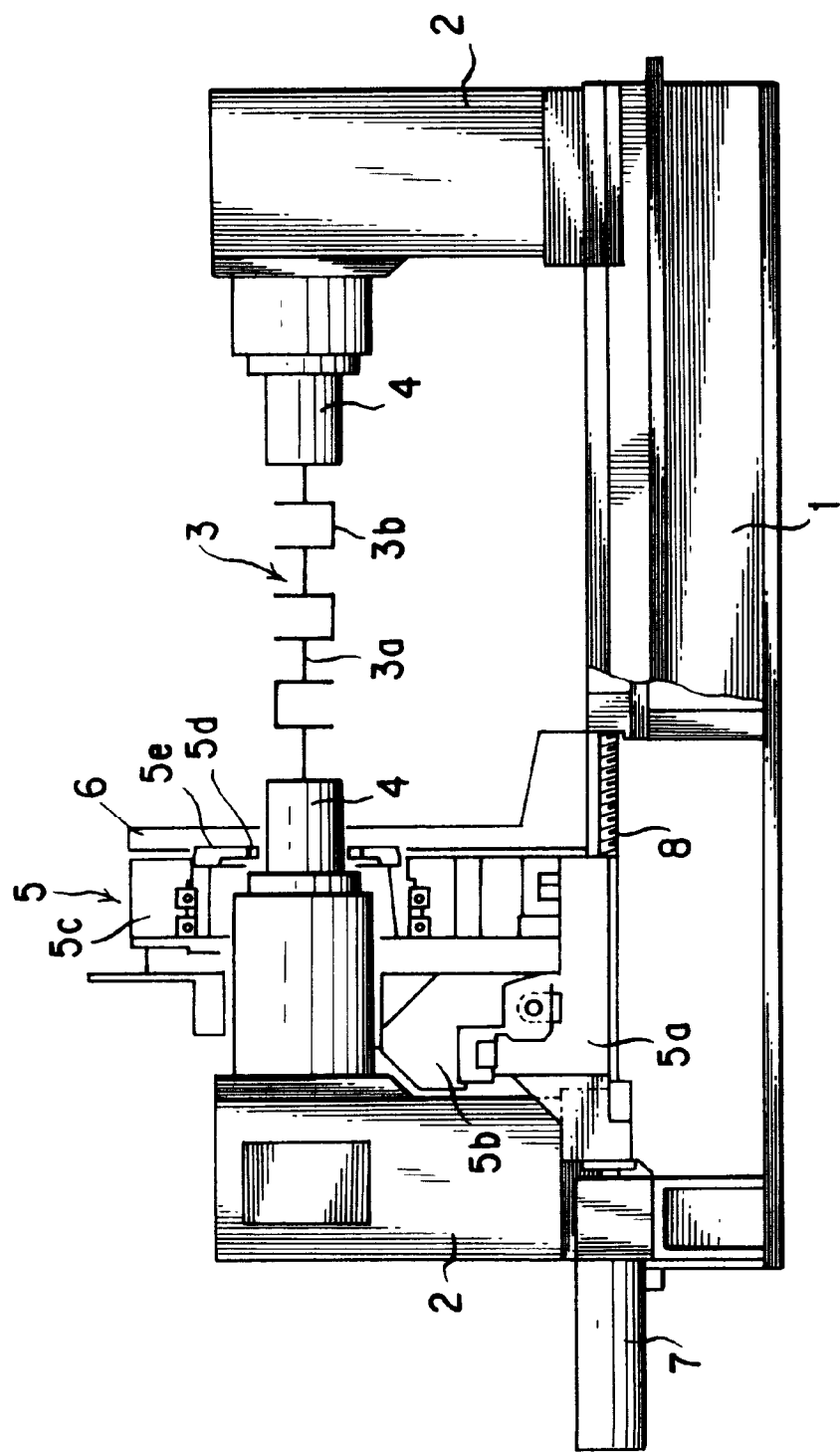
FIG. 1 is a front view that illustrates one form of the crankshaft miller with a part omitted for carrying out a method of the present invention.

One example of the crankshaft miller shown in FIG. 1 in its front view is suitable to practice a method of machining a crankshaft from a workpiece according to the present invention.

The crankshaft miller shown in FIG. 1 has a bed 1 on which a pair of work heads 2 are mounted as movable towards and away from each other.

The work heads 2 are provided in their faces opposing to each other with chucks 4, respectively, which is adapted to carry a workpiece 3 by clamping its opposed ends, respectively, in which a journal portion 3a and a pin portion 3b is provided to be machined.

Figure 2:
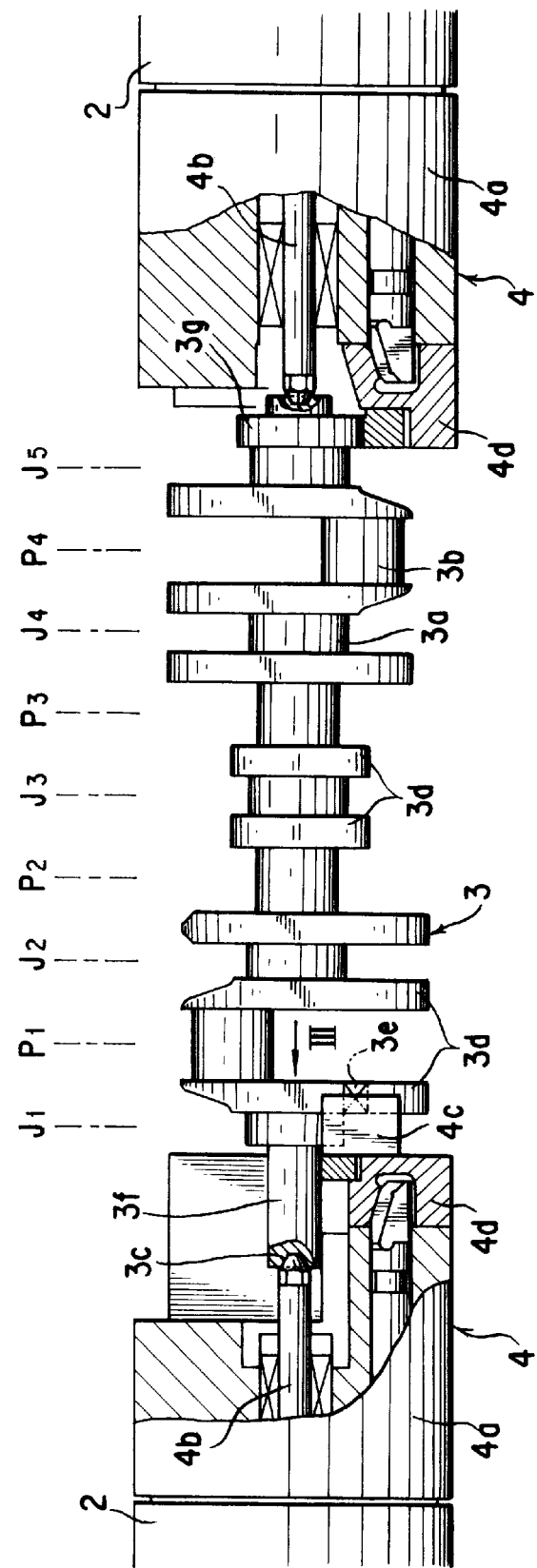
FIG. 2 is an enlarged front view that illustrates a region of chucks in the crankshaft miller shown in FIG. 1.
Figure 3:
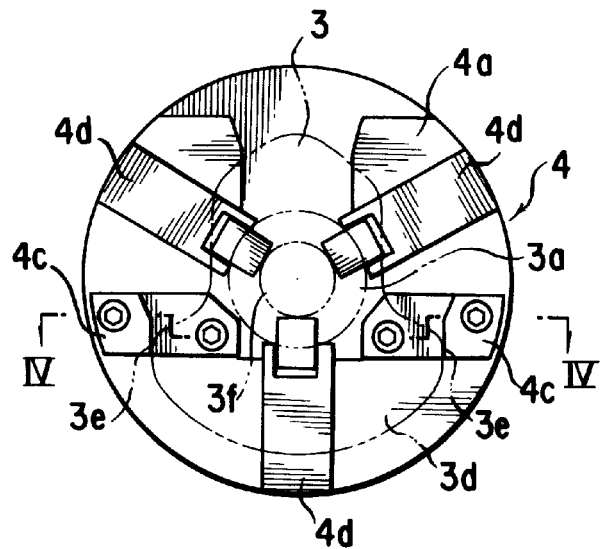
FIG. 3 is a side view that shows a structure shown in FIG. 2 as viewed in the direction of arrow III.
Figure 4:
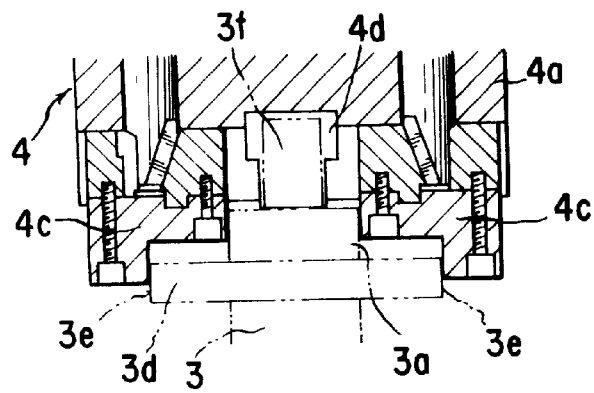
FIG. 4 is a cross sectional view of the structure shown and taken along the line IV-IV in FIG. 3.

As shown in FIGS. 2 to 4, the chucks 4 each comprise a chuck body 4a that has about its center line a center 4b disposed as movable back and forth relative to the chuck body 4a. The centers 4b are adapted to be fitted into center holes 3c formed respectively in the opposed end regions of the workpiece 3 to support the workpiece 3. Here, one of the chucks 4 includes a phase positioning jaw 4c that is adapted to be brought into contact with a phase positioning reference seat 3e which is formed in a counter weight portion 3d of the workpiece located adjacent to one end thereof to establish a required phase position of the workpiece 3. That one chuck 4 also includes a three-piece claw member 4d that is adapted to clamp a pulley shaft 3f provided at one end of the workpiece 3. And, the other chuck 4 includes another three-piece claw member 4d that is adapted to clamp a flange 3g provided at the other end side of the workpiece 3. The workpiece 3 can be clamped thereby at its opposed ends and fixed in position with these chucks 4.

On the bed 1 between the work heads 2 there are mounted a cutter unit 5 and a work rest 6 each movably in a longitudinal direction of the bed 1.

The cutter unit 5 includes a saddle 5a in mesh with a ball screw, threaded shaft 8 that is rotatable by a drive motor 7 mounted on the bed 1 at one end region thereof. The saddle 5a has a slide 5a mounted thereon that is movable in a direction orthogonal to a direction of movement of the saddle 5b.

The slide 5b is provided with a swing arm 5c having a cutter 5e mounted thereto. The cutter 5e is formed on its inner peripheral surface with a number of tips 5d and is rotatable to mill or machine the workpiece 3 with these tips 5d. The swing arm 5c is vertically swung and oscillated by an oscillating mechanism not shown.

Figure 5:
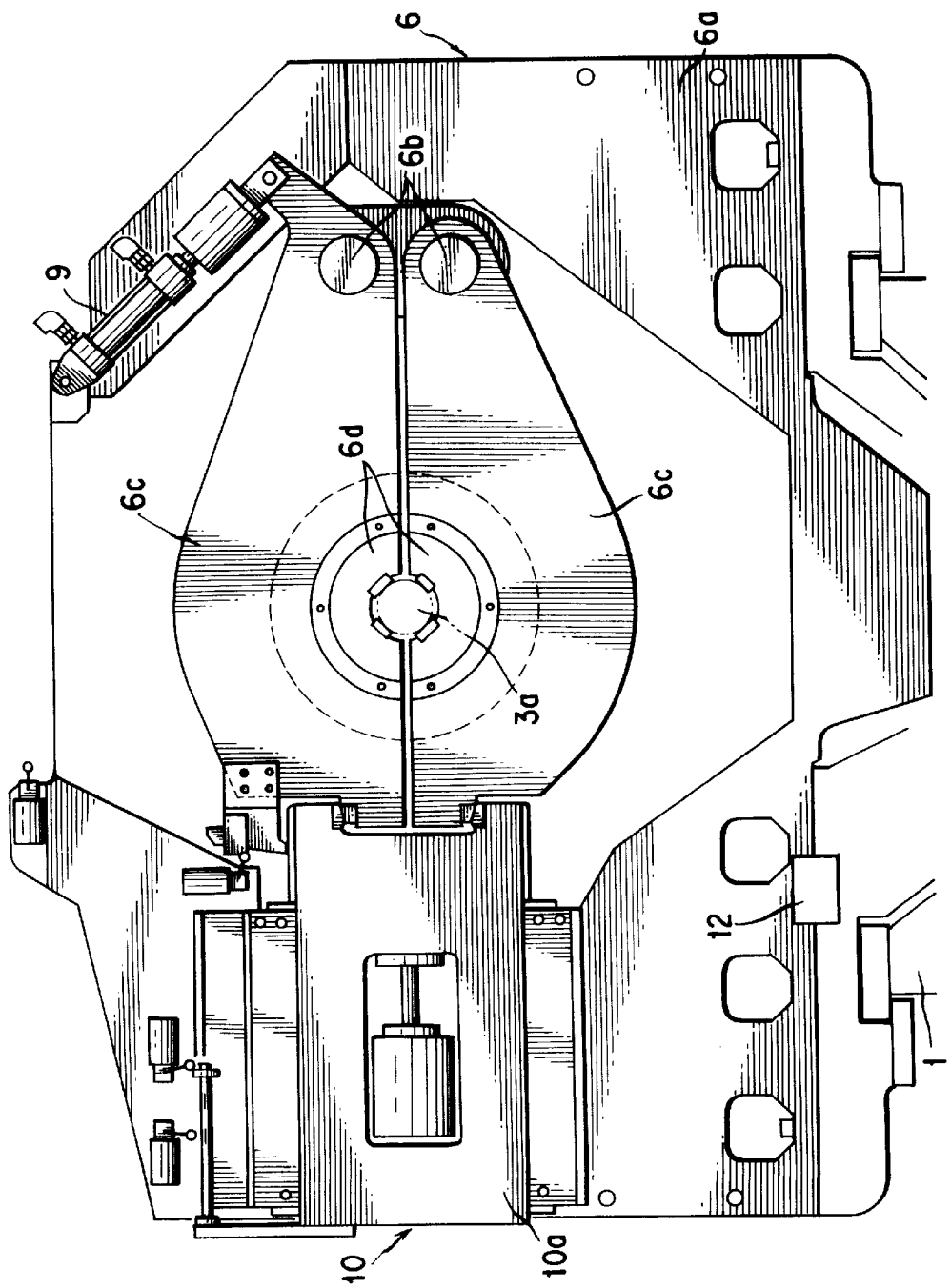
FIG. 5 is a front view that shows the construction of a work rest included in the crankshaft miller shown in FIG. 1.

The work rest 6 as shown in FIG. 5 has a saddle 6a mounted on the bed 1 movably by a drive means (not shown) and has, above the saddle 6a, a pair of rest arms 6c supported pivotally on their respective support shafts 6b so as to be capable of being mutually opened and closed. These rest arms 6c are provided, respectively, on their opposing faces with rest holders 6d for supporting the journal portions 3a of the workpiece 3 both upwards and downwards.

The opening sides of the rest arms 6c are adapted to be held closed by two sandwiching lock plates 10a of a lock mechanism 10 arranged on the saddle 6a to prevent these rest arms 6c from opening while the workpiece 3 is being machined.

Figure 6:
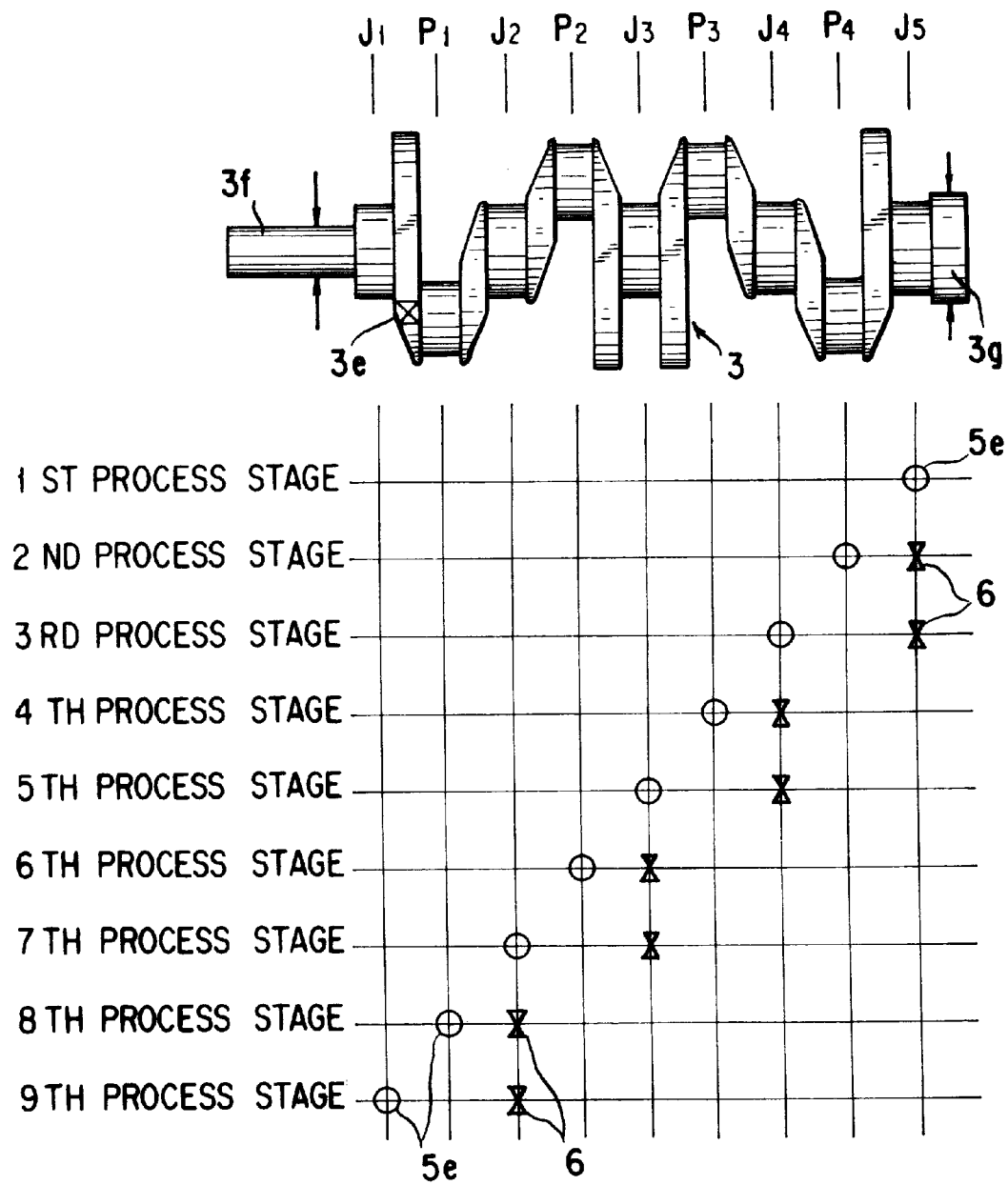
FIG. 6 is a diagrammatic view shown to illustrate a first embodiment of a crankshaft machining method according to the present invention.
Figure 7:
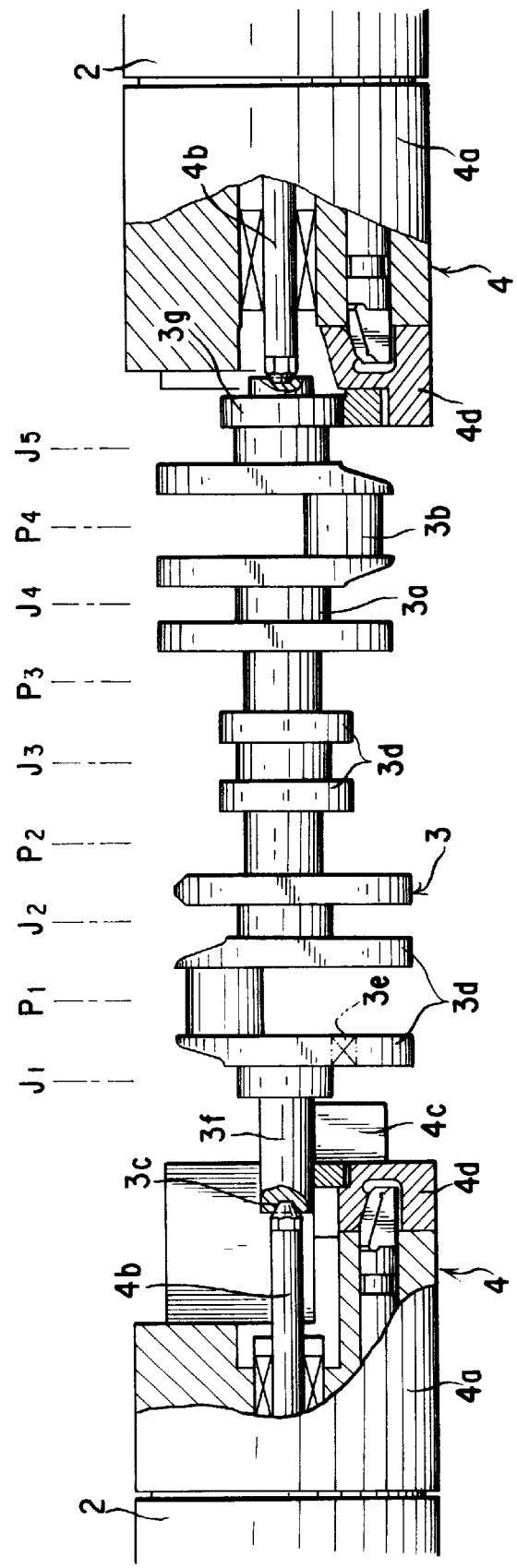
FIG. 7 is a further diagrammatic view shown to illustrate further details of that embodiment.

Referring now to FIGS. 6 and 7, let us explain the first embodiment of a crankshaft machining method practiced with a crankshaft miller in accordance with the present invention.

This embodiment of the machining method applies to a workpiece 3 with its pulley shaft 3f elongated as shown in FIG. 2 and such that retracting the chuck 4 on the side of the pulley shaft may keep the claw member 4d to remain engaged with the pulley shaft 3f.

The workpiece 3 is introduced between the chucks 4 in the crankshaft miller and is supported by both centers 4b provided respectively therein with these centers 4b fitted in the center holes 3 at the opposed ends of the workpiece 3. Then, the phase positioning Jaw 4c that is provided in the chuck 4 on the side of the pulley shaft 3f is brought into contact with the phase positioning reference seat 3e preformed in the counter weight portion 3d of the workpiece 3, thereby establishing a phase position of the workpiece 3.

After the workpiece 3 is phase positioned, both claw members 4d in the chucks 4 are actuated to clamp respectively the pulley shaft 3f and the flange 3g of the workpiece 3 at the sites shown by the arrows in FIG. 6, thereby fixing the workpiece 3 in position.

In the process stages shown in FIG. 6, the fifth journal portion J5 that is located closest to the flange 3g is first milled with the cutter 5e and thereby machined in the first process stage.

After the fifth journal portion J5 is machined completely, the cutter 5e is displaced to position ahead of the fourth pin portion P4. And, the work rest 6 is removed to position ahead of the fifth journal J5 that has already been machined, which becomes supported by the work rest 6. The fourth pin portion P4 is now milled with the cutter 5e and thereby machined in the second process stage.

In the third process stage, the fourth journal portion J4 is milled and thereby machined with the fifth journal portion J5 still supported by the work rest 6.

Next, the cutter 5e is displaced to lie ahead of the third pin portion P3 and the work rest 6 is removed to position ahead of the fourth journal portion J4 having been machined to support the fourth journal portion J4. Then, the third pin portion P3 is milled with the cutter 5e and thereby machined in the fourth process stage.

Thereafter, with the operation likewise repeated, the third journal portion J3, the second pin portion P2, the second journal portion J2 and the first pin portion P1 are milled and thereby machined in succession, in the fifth, the sixth, the seventh and the eighth process stages, respectively.

In the ninth process stage in which the first journal portion J1 must be machined, the phase positioning jaw 4c that has been located in contact with the phase positioning reference seat 3e preformed in the counter weight portion 3d does interfere with the cutter 5e, thereby preventing the first journal portion J1 from being milled and thereby machined.

Then, here in the ninth process stage, the chuck 4 in which the pulley shaft 3f is clamped is unclamped and the work head 2 lying on the side of the unclamped chuck 4 is retracted.

It can then be seen that the elongated pulley shaft 3f of the workpiece 3 ensures that that chuck 4 if retracted keeps the claw member 4d from coming out of engagement therewith.

The work head 2 is retracted to a position where the phase positioning jaw 4c may no longer interfere with the cutter 5e that is going to machine the first journal portion J1 as shown in FIG. 7. With the work head 2 so located, the chuck 4 is permitted to clamp the pulley shaft 3f again, to allow the cutter 5e to commence milling, thereby machining the first journal portion J1 in the workpiece 3.

Then, after all the journal portions 3a and the pin portions 3b have been machined, both of the chucks 4 are unclamped to permit the machined workpiece 3 to be taken out and a new workpiece 3 to be introduced into the crankshaft miller in order to be machined in the process with the described stages repeated. Thus, the possibility is here realized to provide a crankshaft with journals 3a and pins 3b all machined with a single unit of crankshaft miller from each of the workpieces 3.

Figure 8:
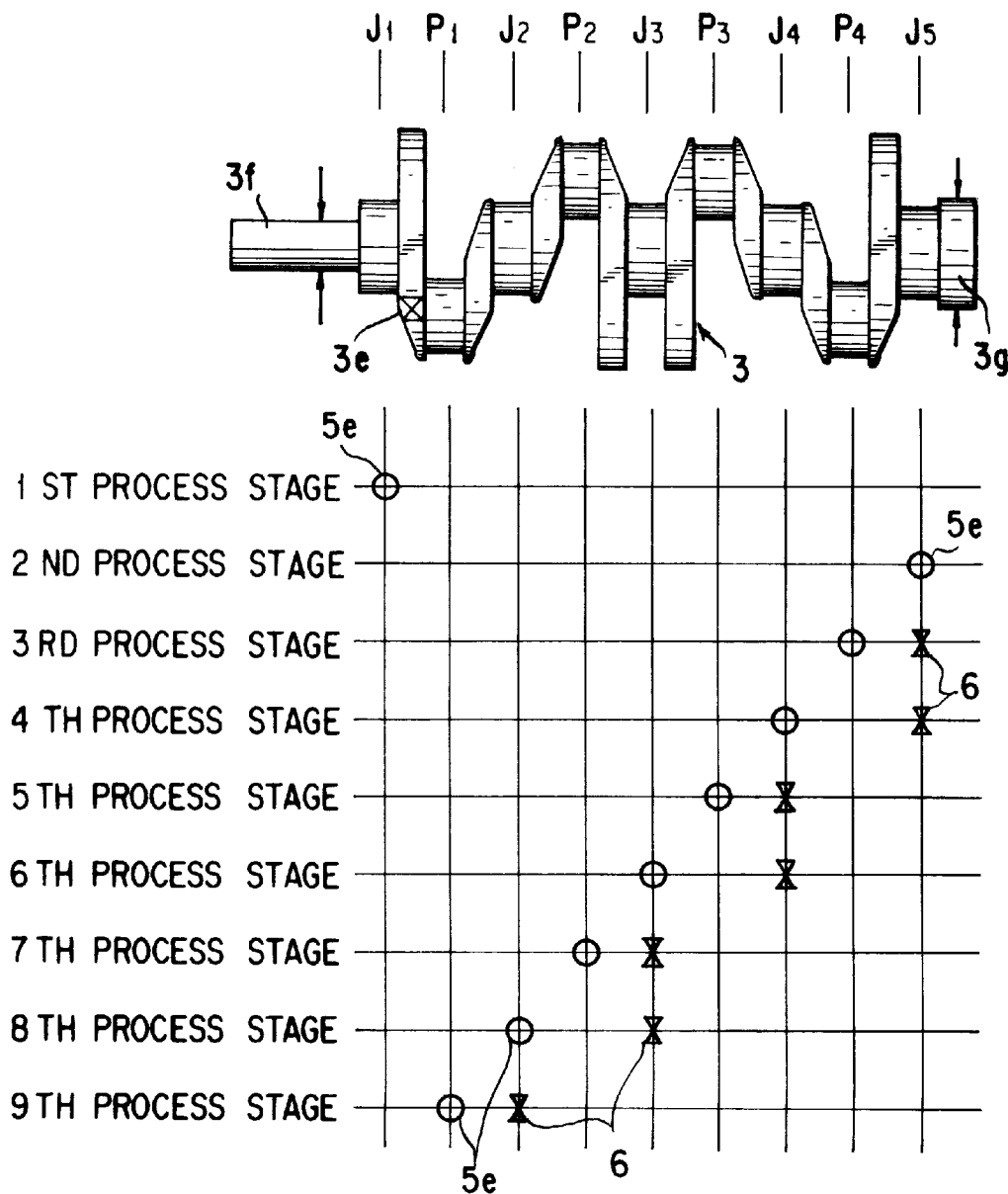
FIG. 8 is a diagrammatic view shown to illustrate a second embodiment of the crankshaft machining method of the present invention.

While in the first embodiment of the method of the invention described a first journal portion J1 is machined in the ninth machining process stage, it should be noted that the first journal portion J1 can be machined in the first machining process stage, i. e., before all the other portions are machined likewise, in a second embodiment of the present inventive method described in connection with FIG. 8 below.

Thus, in the second embodiment, the workpiece 3 introduced in the crankshaft miller is not phase positioned first and, where the chuck 4 on the side of its pulley shaft 3f is retracted, is clamped with the both chucks 4 to allow its first journal portion J1 to be machined fist, i. e., in the first process stage.

Then, the workpiece 3 with the first journal portion J1 that has been machined is unclamped at its both end sides and the chuck 4 on the side of the pulley shaft 3f is advanced to a position where the workpiece 3 can be phase positioned with the phase positioning jaw 4c.

The workpiece 3 that has been phase positioned is then clamped to permit itself to be machined, starting with its fifth journal portion J5 and thereafter continuingly in succession, as in the first embodiment described.

And, ending with the first pin portion P1 in the ninth process stage, all the Journal portions 3a and the pin portions 3b have been machined.

While the arrangement described above advantageously applies to a workpiece 3 with a pulley shaft 3f elongated, if the workpiece 3 has a pulley shaft 3f not elongated, it follows that the chuck 4 on the side of the pulley shaft 3f if retracted to a position where the phase positioning jaw 4c may no longer interfere with the cutter 5e causes the claw member 4d to be out of engagement with the pulley shaft 3f so that the workpiece 3 can no longer be clamped again.

Thus, a method of machining a crankshaft workpiece 3 even with a pulley shaft 3f not elongated, that is embodied in another aspect in accordance with the present invention is described below with reference to FIGS. 9 and 10.

Figure 9:
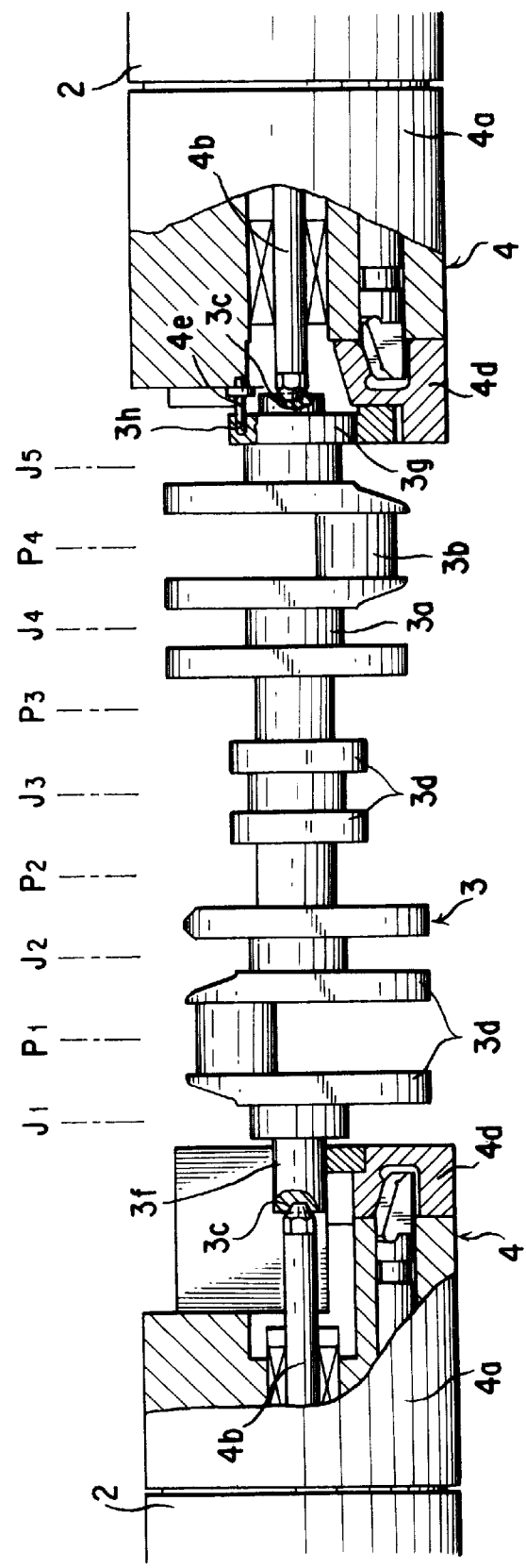
FIG. 9 is a front view that shows another form of the crankshaft miller with a part omitted for carrying out a method of the present invention.

FIG. 9 shows a crankshaft miller that can be used to machine a workpiece 3 with a pulley shaft 3f, either short or long whichever. This crankshaft miller can be used with a workpiece 3 with a flange 3g having a phase positioning hole 3h preformed in an end face thereof, and is arranged to include a chuck 4 for clamping the flange 3g on the side of the workpiece 3. That chuck 4 is provided on its end face with a phase positioning reference pin 4e as a projection adapted to be fitted into the phase positioning hole 3h preformed in the workpiece 3 so that the workpiece 3 may then be phase positioned.

Figure 10:
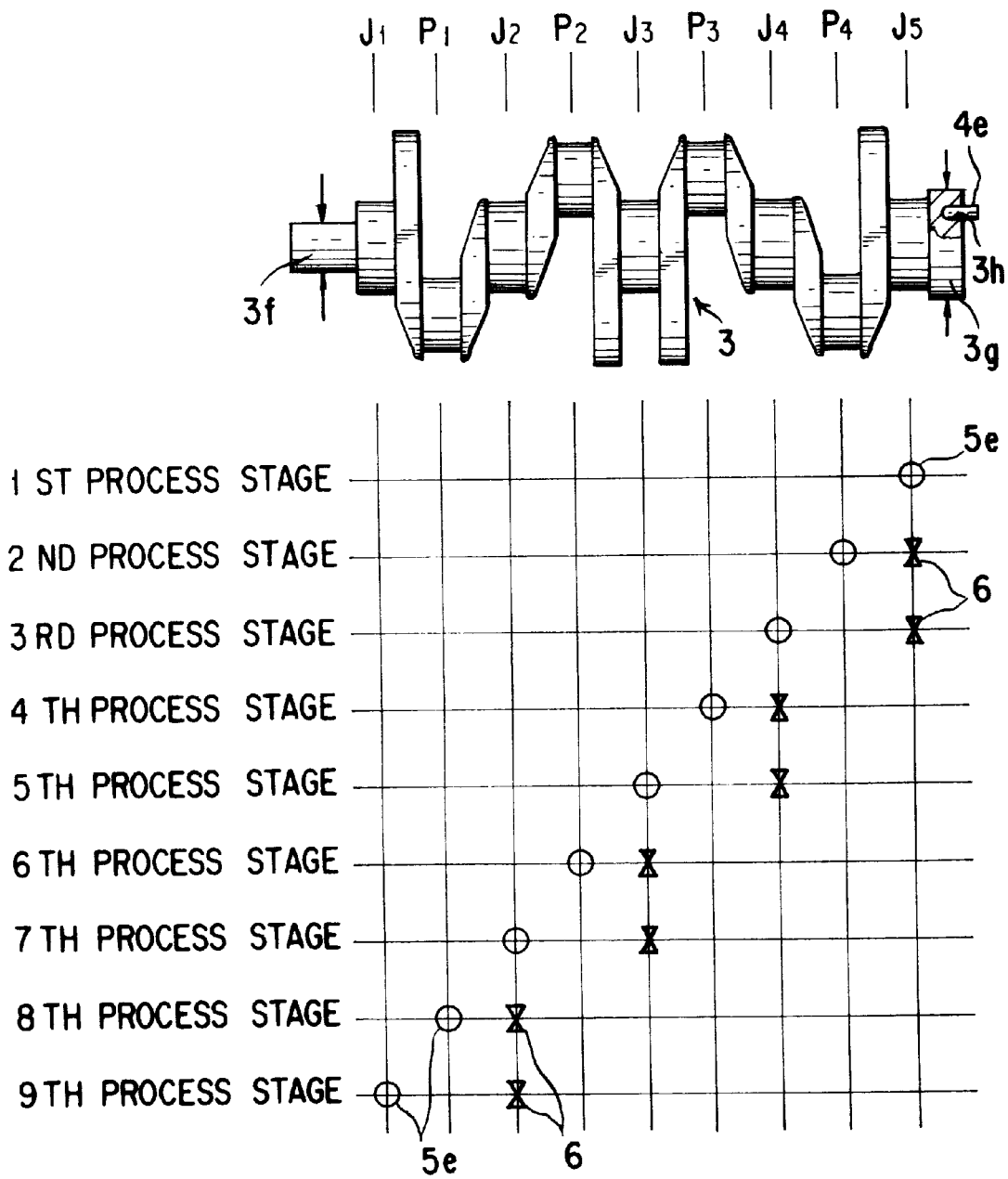
FIG. 10 is a diagrammatic view shown to illustrate a third embodiment of the crankshaft machining method of the present invention.

Referring now to FIG. 10, the crankshaft machining method is described, representing a third embodiment of the present invention using the crankshaft miller shown in FIG. 9.

The workpiece 3 that is introduced between the chucks 4 in the crankshaft miller is supported by the centers 4b therein with these centers fitted with the center holes 3c at the opposed ends of the workpiece 3. Either the workpiece 3 or the chucks 4 can then be rotated to permit the phase positioning reference pin 4e provided in the chuck 4 for clamping the workpiece 3 at its flange 3g side to be fitted into the phase positioning hole 3h preformed in the workpiece 3. The workpiece 3 can thus be phase positioned.

After the workpiece 3 is phase positioned, both the claw members 4d in the chucks 4 are actuated to clamp the pulley shaft 3f and the flange 3g of the workpiece 3 at the sites, respectively, that are shown by the arrows in FIG. 10, thereby fixing the workpiece 3 in position.

In the first process stage shown in FIG. 10, the fifth journal portion J5 that is located closest to the flange 3g is first milled with the cutter 5e and thereby machined.

After the fifth journal portion J5 is machined, the cutter 5e is displaced to position ahead of the fourth pin portion P4. And, the work rest 6 is removed to position ahead of the fifth journal J5 that has been machined, which thus becomes supported by the work rest 6. The fourth pin portion P4 is now milled with the cutter 5e and thereby machined in the second process stage.

In the third process stage, the fourth journal portion J4 is milled and thereby machined, with the fifth journal portion J5 still supported by the work rest 6.

Next, the cutter 5e is displaced to lie ahead of the third pin portion P3 and the work rest 6 is removed to position ahead of the fourth journal portion J4 having been machined to support the fourth journal portion J4. Then, the third pin portion P3 is milled with the cutter 5e and thereby machined in the fourth process stage.

Thereafter, with the operation likewise repeated, the third journal portion J3, the second pin portion P2, the second journal portion J2 and the first pin portion P1 are machined in succession, in the fifth, the sixth, the seventh and the eighth process stages, respectively.

In the final, ninth process stage in which the first journal portion JI is to be machined with the cutter 5e, it is seen that the absence on the chuck 4 side for clamping the pulley shaft 3f of a phase positioning pin or anything else that may interfere with the cutter 5e permits the first journal portion J1 to be machined without the need to retract the chuck 4.

Figure 11:
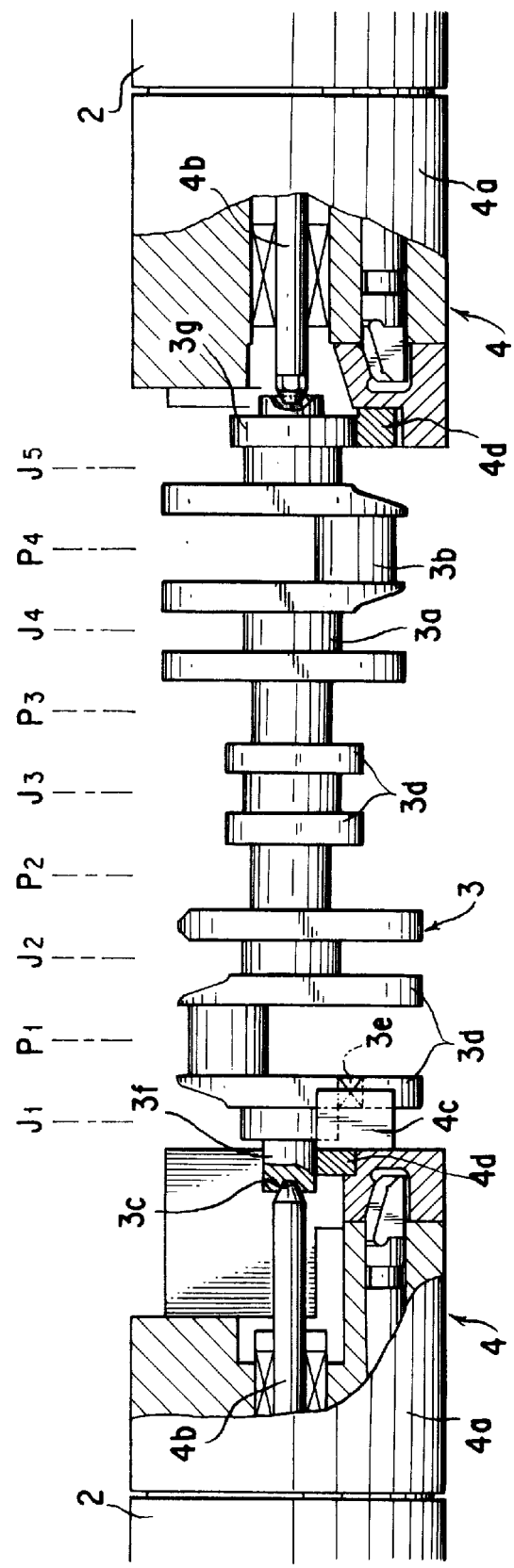
FIG. 11 is an enlarged front view that shows a region of chucks in the crankshaft miller shown in FIGS. 1 and 2, which are shown to carry a workpiece having a short pulley shaft.
Figure 12:
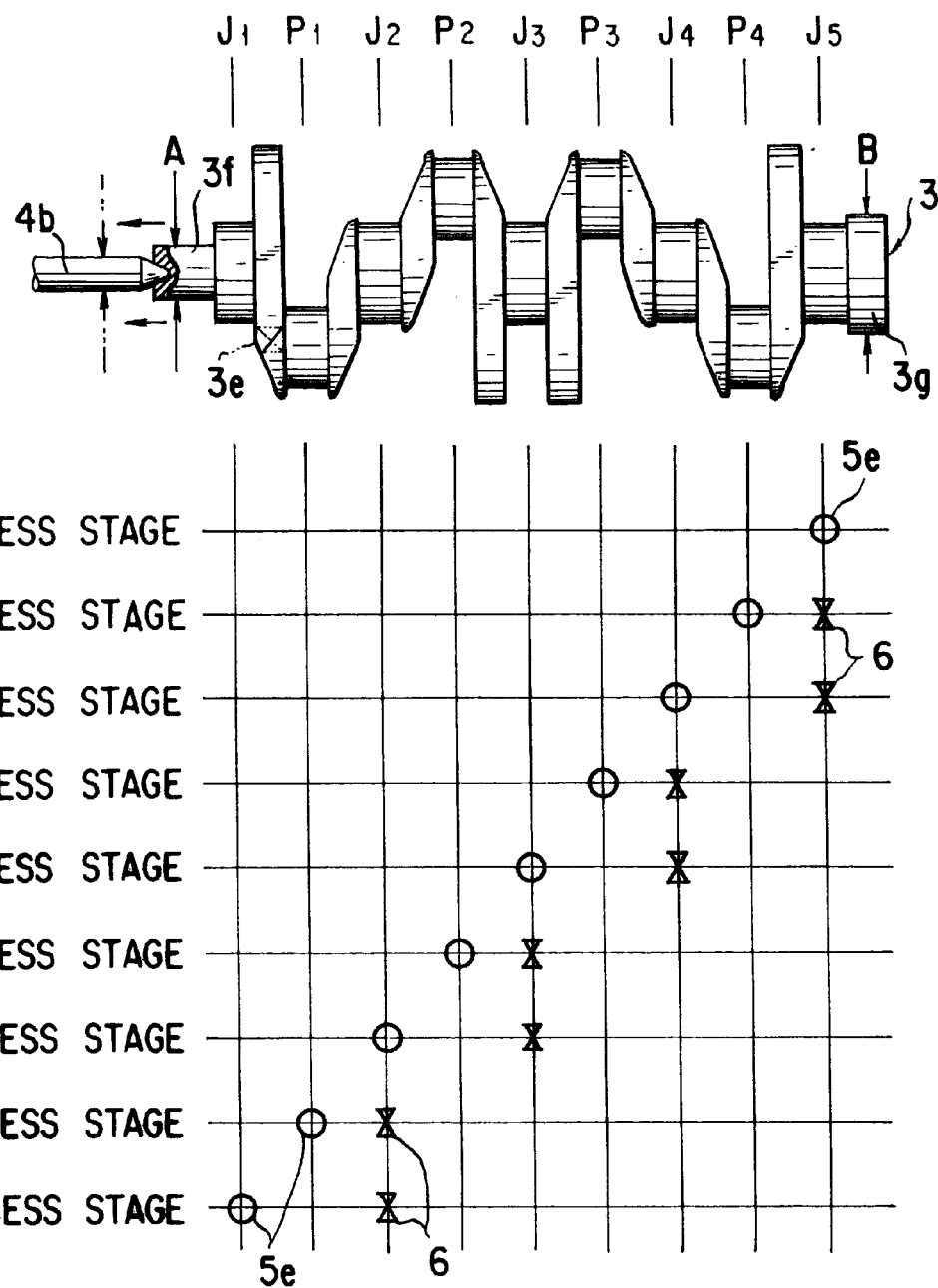
FIG. 12 is a diagrammatic view shown to illustrate a fourth embodiment of the crankshaft machining method of the present invention.
Figure 13:
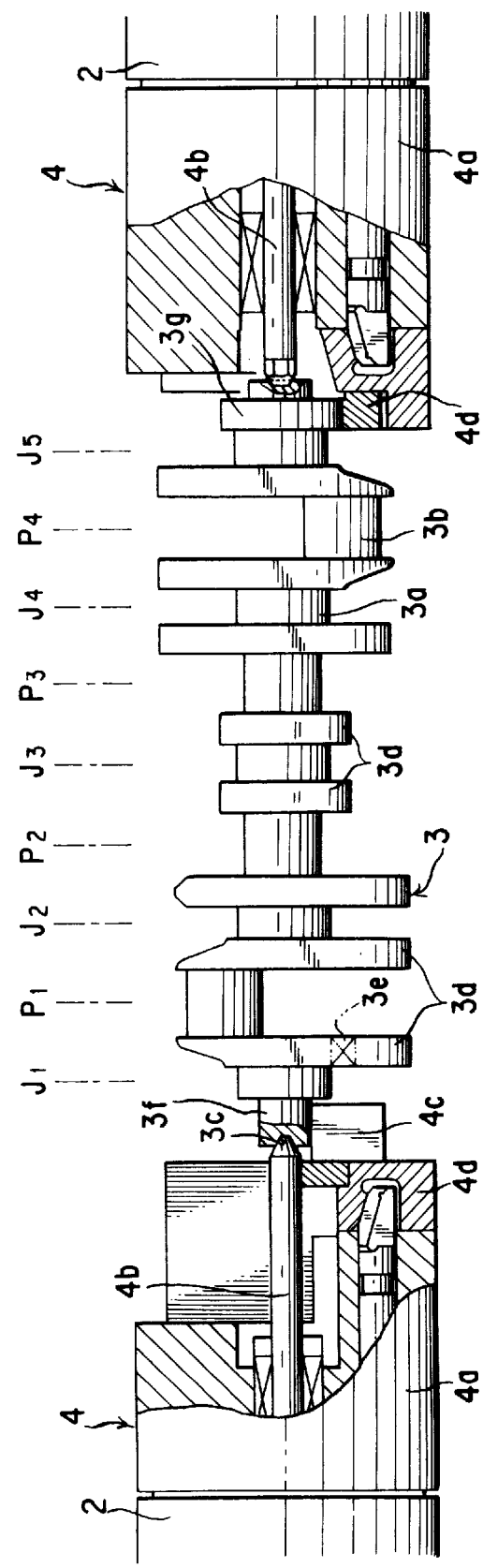
FIG. 13 is a further diagrammatic view shown to illustrate further details of that fourth embodiment.

Reference is next made to FIGS. 11 to 13 for the description of another method of machining a crankshaft workpiece using the crankshaft miller shown in FIG. 2.

This method applies to a workpiece 3 with its pulley shaft 3f not elongated such that retracting the chuck 4 on the side of the pulley shaft 3f causes the claw member 4c to be out of engagement with the pulley shaft 3f, thus making it impossible to clamp the pulley shaft 3f.

The workpiece 3 is introduced between the chucks 4 in the crankshaft miller and is supported by both the centers 4b provided respectively in the chucks 4 with these centers 4b fitted in the center holes 3c at the opposed ends of the workpiece 3. Then, the phase positioning jaw 4c provided in the chuck 4 on the side of the pulley shaft 3f is brought into contact with the phase reference seat 3e preformed in the counter weight portion 3d of the workpiece 3, thereby establishing a phase position of the workpiece 3.

After the workpiece 3 is phase positioned, both the claw members 4d in the chucks 4 are actuated to clamp respectively the pulley shaft 3f and the flange 3g of the workpiece 3 at the sites shown by the arrows A and B in FIG. 12, thereby fixing the workpiece 3 in position as shown in FIG. 11.

In the first process stage shown in FIG. 12, the fifth journal portion J5 that is located closest to the flange 3g is first milled with the cutter 5e and thereby machined.

After the fifth journal portion J5 is machined, the cutter 5e is displaced to position ahead of the fourth pin portion P4.

And, the work rest 6 is removed to position ahead of the fifth journal portion J5 that has been machined, which then becomes supported by the work rest 6. The fourth pin portion P4 is now milled with the cutter 5e and thereby machined in the second process stage.

In the third process stage, the fourth journal portion J4 is milled and thereby machined, with the fifth journal portion J5 still supported by the work rest 6.

Next, the cutter 5e is displaced to lie ahead of the third pin portion P3 and the work rest 6 is removed to position ahead of the fourth journal portion J4 having been machined to support the fourth journal portion J4. Then, the third pin portion P3 is milled with the cutter 5e and thereby machined in the fourth process stage.

Thereafter, with the operation likewise repeated, the third journal portion J3, the second pin portion P2, the second journal portion J2 and the first pin portion P1 are machined in succession, in the fifth, the sixth, the seventh and the eighth process stages, respectively.

In the ninth process stage in which the first journal portion J1 needs to be machined, the phase positioning jaw 4c that has been located in contact with the phase positioning reference seat 3e preformed in the counter weight portion 3d does interfere with the cutter 5e, thereby preventing the first journal portion J1 from being machined.

Then, here, in the ninth process stage, the chuck 4 in which the pulley shaft 3f is clamped is unclamped. Then, with the workpiece 3 held clamped at its both sides with the centers 4b in the both chucks 4, only the chuck 4 on the side of pulley shaft 3f is retracted to a position at which the phase positioning jaw 4c does not interfere with the cutter 5e that is going to machine the first journal portion J1.

Then, where the chuck 4 is retracted to an extent such that the cutter 5e does not interfere with the phase positioning jaw 4c, it can be seen that while the shortness of the pulley shaft 3f prevents it from being clamped by the the chuck 4 with the claw member 4d as shown in FIG. 13, the center 4b elongated towards the root end of the pulley shaft 3f permits the claw member 4d of the chuck 4 to clamp the center 4b at a site on its elongated side and to prevent the center 4b thereby from fluctuating in position.

The first journal portion J1 is now machined with the cutter 5e brought into a machining position therefor in the state that the work rest 6 is clamping the second journal portion J2 as in the eighth process stage. Then, the center 4b in the chuck 4 on the pulley shaft 3f side is thus prevented from fluctuating in position under a reactive force in milling that is exerted thereon in this machining operation, thus permitting the first journal portion J1 to be milled and thereby machined highly accurately.

After all of the journal portions 3a and the pin portions 3b have been machined, the chucks 4 are unclamped to permit the machined workpiece 3 to be taken out and a new workpiece 3 to be introduced into the crankshaft miller in order to be machined in the process with the described stages repeated. Thus, the possibility is here again ensured to provide a crankshaft with journals 3a and pins 3b all machined with a single unit of the crankshaft miller from an individual workpiece 3.

While in the preceding embodiment of the method of the invention, a first journal portion J1 is machined here too in the ninth machining stage, it should be noted that the first journal portion J1 can be machined in the first machining stage, i. e., before all the other portions are machined likewise, in a fifth embodiment of the present inventive method described in connection with FIG. 14 below.

Thus, in this alternative embodiment, the workpiece 3 introduced into the crankshaft miller and clamped at its both sides each with the center 4b in each of the chucks 4, respectively, is not phase positioned first. And, where the chuck 4 on the side of its pulley shaft 3f is retracted so that the phase positioning jaw 4c may not interfere with the cutter 5e for machining the first journal portion J1, the center 4b is clamped at a site on its elongated end side (as shown by the arrow A in FIG. 12) with the claw member 4d in the chuck 4 on the pulley shaft 3f side and the flange 3g of the workpiece 3 is clamped (at a site as shown by the arrow B) with the chuck 4 on other side to permit the first journal portion J1 to be machined in the first process stage.

Then, after the first journal portion J1 has been machined in the first process stage, the center 4b in the chuck 4 on the pulley shaft 3f side is operated to unclamp the center 46 and the other chuck 4 is operated to unclamp the workpiece 3. The chuck 4 on the pulley shaft 3f side is then advanced to permit the workpiece 3 so unclamped to be phase positioned with the phase positioning jaw 4c.

The workpiece 3 that has been phase positioned is then clamped again at its both sides with the chucks 4 to permit it to be machined, commencing with its fifth journal portion J5 and thereafter continously in succession, as in the fourth embodiment described previously.

And, ending with the first pin portion P1 in the ninth process stage, all of the journal portions 3a and the pin portions 3b have been machined.

Figure 14:
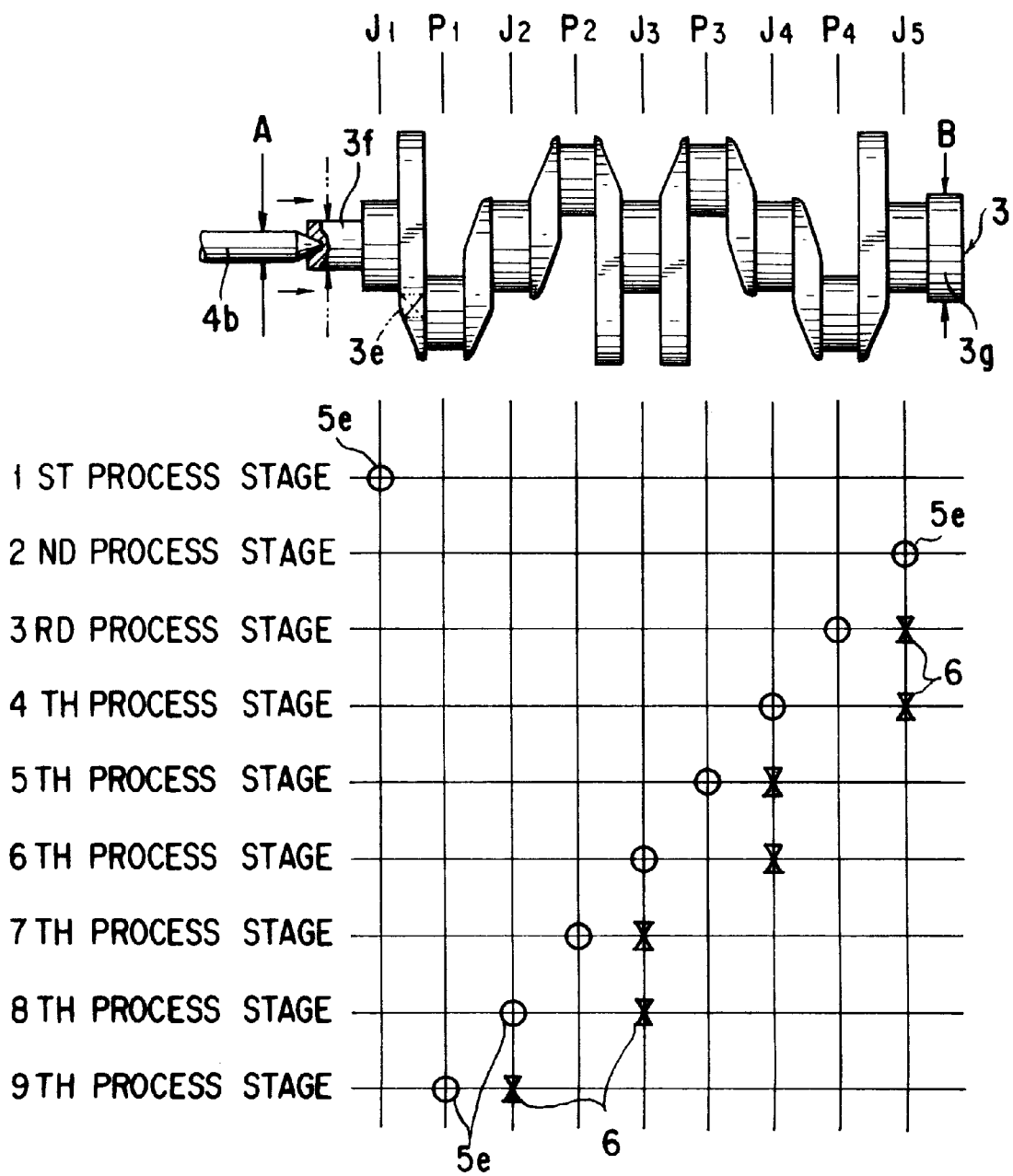
FIG. 14 is a diagrammatic view shown to illustrate a fifth embodiment of the crankshaft machining method of the present invention.

These journal portions 3a and pin portions 3b machined in each of process stages in embodiments of the method according to the present invention are shown in FIG. 14.

It should be noted at this point that if journal portions 3a and pin portions 3b to be machined are different in width and/or R-cornered groove configuration, each individual journal, pin portion 3a, 3b can be machined in a plurality of divided machining steps with a cutter 5e that is smaller in width than the journals and pins. Otherwise, if they are identical in configuration, a form type cutter can be used to machine each of them in a single machining step.

Further, in a crankshaft miller provided with a pair of cutter units 5, e. g., one on the left hand side and the other on the right hand side in the miller, a cutter 5e in one of them can be designed to be a rough machining cutter with a cutter 5e in the other designed to be a finish machining cutter, to machine each portion of a workpiece to in a plurality of steps, thereby permitting the need for a medium/finish machining operation to be eliminated.

A machining procedure in which journal portions 3a and pin portions 3b are successively machined, each in a plurality of steps is described below with reference to FIG. 15.

Figure 15:
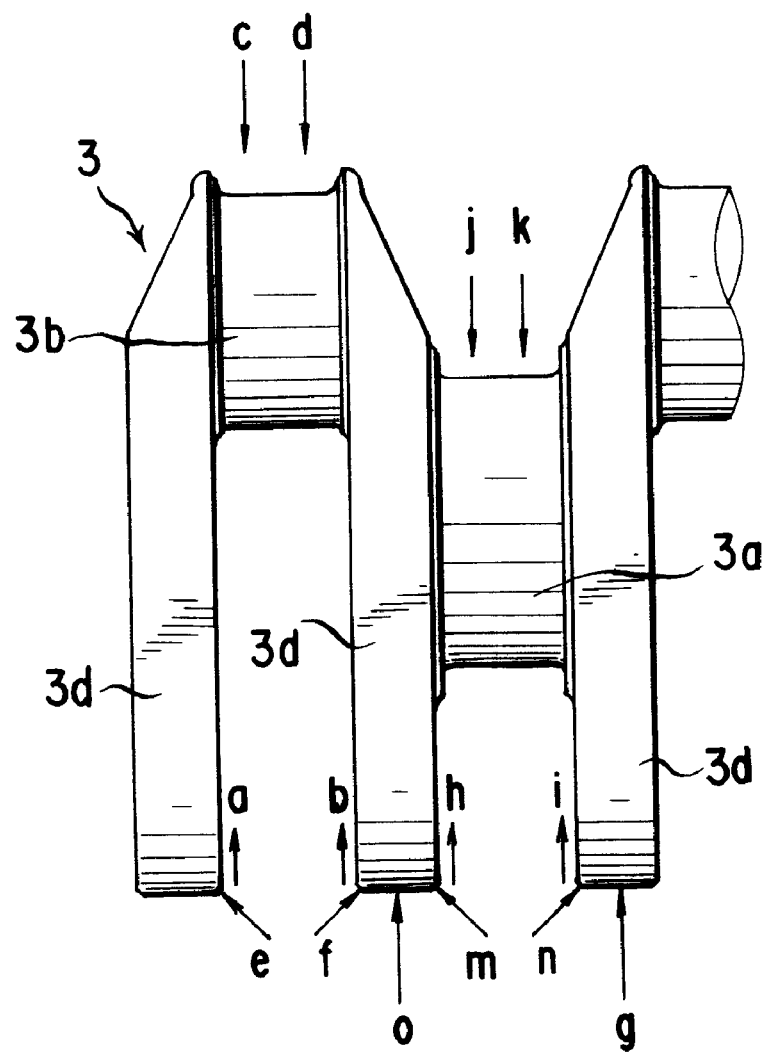
FIG. 15 is a diagrammatic view that illustrates a machining procedure using a crankshaft miller provided with a pair of cutter units.

As shown in FIG. 15, a pin portion 3b is machined first for the opposing side surfaces a and b of the counter weight portions 3d located at its both sides and then for its outer peripheral surfaces c and d in two steps.

Then, after the peripheral regions e and f of the opposing counter weight portions 3d are chamfered, the outer peripheral surface g of the counter weight portion 3d of the journal portion 3a that is adjacent to the pin portion 3b is machined.

Thereafter, as in the pin portion 3b, the opposing side surfaces h and i of the counter weight portions 3d at the both sides of the journal portion 3a are machined, the outer peripheral surfaces j and k of the journal portion 3a are machined, the respective peripheral regions m and n of the both counter weight portions 3d are chamfered, and the outer peripheral surface o of the counter weight portion 3d that is adjacent to the journal portion 3a is machined.

Figure 16:
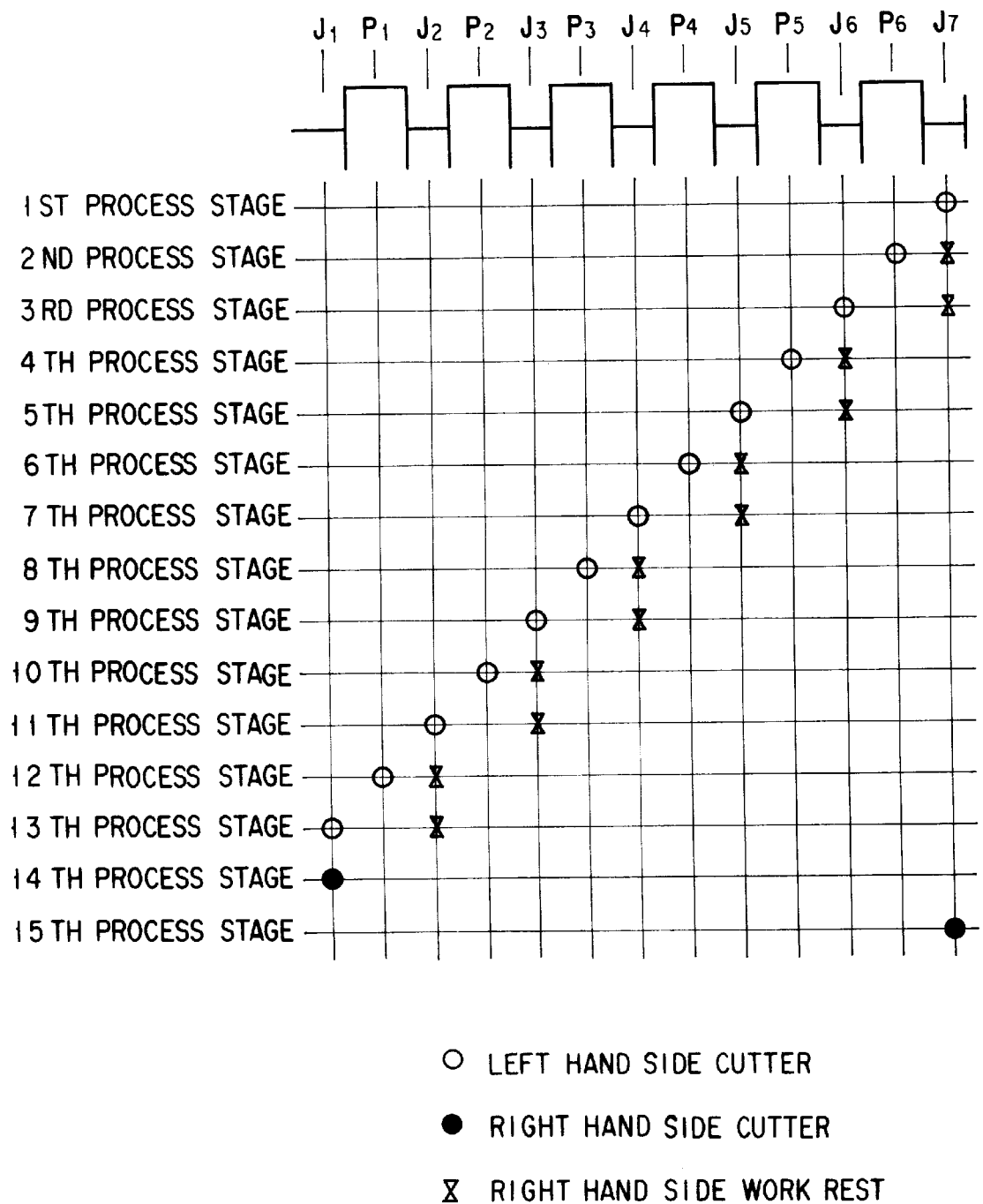
FIG. 16 is a diagrammatic view shown to illustrates a machining process of a crankshaft using that procedure.

With such a machining procedure likewise repeated, all of the journal portions 3*a* and the pin portions 3*b* are successively machined. FIG. 16 shows in a chart a process of machining a crankshaft for use in a six cylinder engine, using the machining procedure mentioned above.

In concluding the description, it should be noted that while in the several embodiments described, the cutter unit 5 and the work rest 6 are arranged to be displaced by separate drive means, respectively, it is naturally possible to provide a coupling means between the cutter unit 5 and the work rest 6 for uncouplably connecting them to enable a drive means for one of them, e. g., the cutter unit 5, to displace the other, e. g., the work rest 6.

It should also be noted that while the embodiments illustrated are described in connection with a crankshaft miller arrangement in which a workpiece 3 is fixed in position between a pair of chucks 4 while each of journal and pin portions 3*a* and 3*b* is machined therein, the method according to the present invention can likewise be embodied with an crankshaft miller arrangement in which a workpiece 3 is rotated while each of journal and pin portions 3*a* and 3*b* is machined therein or a crankshaft miller arrangement with a cutter 5*e* having a multiplicity of tips 5*d* on its outer peripheral surface to mill and thereby machine a workpiece 3.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the invention is not intended to be limited to the specific embodiments thereof set out above, but to include all possible embodiments thereof that can be made within the scope with respect to the features specifically set forth in the appended claims and encompasses all the equivalents thereof.

What is claimed is:

1. A method of machining a crankshaft from a workpiece with opposed ends of the workpiece clamped by a pair of chucks using a rotating cutter to mill and thereby machine journal and pin portions of the workpiece successively, said method comprising:

providing a phase positioning jaw in one of said pair of chucks;

establishing a phase position of the workpiece with said phase positioning jaw;

clamping the opposed ends of the workpiece with both of said pair of chucks;

milling with said cutter, thereby machining the journal and pin portions of said workpiece in succession except a first journal portion that is located at a position at which said phase positioning jaw and said cutter interfere with each other;

unclamping the one of said chucks that is provided with said phase positioning jaw and retracting said chuck to a position at which said jaw and said cutter no longer interfere with each other;

clamping again said opposed ends of the workpiece with said one of said chucks so that said opposed ends of the workpiece are again clamped by both of said pair of chucks; and thereafter milling and thereby machining said first journal portion with said cutter, so that all of the journal and pin portions are machined using a single crankshaft miller unit.

2. A method of machining a crankshaft from a workpiece with opposed ends of the workpiece clamped by a pair of chucks using a rotating cutter to mill and thereby machine journal and pin portions of the workpiece successively, said method comprising:

providing a phase positioning jaw in one of said pair of chucks;

clamping the opposed ends of the workpiece with both of said pair of chucks, with said one of said chucks in which said phase positioning law is provided being at a position at which said phase positioning jaw and said cutter do not interfere with each other; thereafter milling and thereby machining a first journal portion in said workpiece with said cutter;

unclamping both of said pair of chucks and then advancing said one of said chucks in which the phase positioning jaw is provided, and establishing a phase position of said workpiece with said phase positioning jaw;

clamping again the opposed ends of said workpiece with both of said pair of chucks; and thereafter milling and thereby machining all remaining journal and pin portions other than said first journal portion in said workpiece, in succession with said cutter, so that all of the journal and pin portions are machined with a single crankshaft miller unit.

3. A method of machining a crankshaft from a workpiece with opposed ends of the workpiece supported by a pair of centers and clamped by a pair of chucks using a rotating cutter to mill and thereby machine journal and pin portions successively in the workpiece, said method comprising:

providing a phase positioning jaw in one of said pair of chucks;

establishing a phase position of the workpiece with said phase positioning jaw;

clamping the opposed ends of the workpiece with both of said pair of chucks; and thereafter milling with said cutter, thereby machining the journal and pin portions of said workpiece in succession, except a first journal portion that is located at a position at which said phase positioning jaw and said cutter interfere with each other;

unclamping the one of said chucks that is provided with said phase positioning jaw and retracting said chuck to a site at which said jaw and said cutter no longer interfere with each other;

clamping one of said centers that is located proximal to said first journal with said one of said chucks that is provided with said phase positioning law; and thereafter milling and thereby machining said first journal portion with said cutter, so that all of the journal and pin portions are machined using a single crankshaft miller unit.

4. A method of machining a crankshaft from a workpiece with opposed ends of the workpiece supported by a pair of centers and clamped by a pair of chucks using a rotating cutter to mill and thereby machine journal and pin portions successively in the workpiece, said method comprising:

providing a phase positioning jaw in one of said pair of chucks;

clamping one of said centers that is located proximal to a first journal portion of the workpiece with the one of said chucks that is provided with said phase positioning jaw at a position at which said phase positioning jaw does not interfere with said cutter, and clamping said workpiece at an opposite end with the other one of said pair of chucks, thereafter milling and thereby machining a first journal portion in said workpiece with said cutter;

unclamping both of said pair of chucks and then advancing said one of said chucks that is provided with said phase positioning law, and establishing a phase position of said workpiece with said phase positioning jaw;

clamping again said workpiece at the opposed ends of said workpiece with both of said pair of chucks; and thereafter milling and thereby machining all remaining journal and pin portions other than said first journal portion, in succession in said workpiece with said cutter, so that all of the journal and pin portions are machined with a single crankshaft miller unit.

* * * * *